(12) United States Patent
Zhang

(10) Patent No.: US 10,318,259 B2
(45) Date of Patent: Jun. 11, 2019

(54) TECHNOLOGY TO USE CONTROL DEPENDENCY GRAPHS TO CONVERT CONTROL FLOW PROGRAMS INTO DATA FLOW PROGRAMS

(71) Applicant: Intel Corporation, Santa Clara, CA (US)

(72) Inventor: Yongzhi Zhang, Wayland, MA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 15/609,583

(22) Filed: May 31, 2017

(65) Prior Publication Data

US 2018/0349115 A1    Dec. 6, 2018

(51) Int. Cl.
| | |
|---|---|
| *G06F 8/41* | (2018.01) |
| *G06F 8/20* | (2018.01) |
| *G06F 8/34* | (2018.01) |
| *G06F 15/82* | (2006.01) |

(52) U.S. Cl.
CPC .............. *G06F 8/433* (2013.01); *G06F 8/20* (2013.01); *G06F 8/34* (2013.01); *G06F 15/825* (2013.01)

(58) Field of Classification Search
None
See application file for complete search history.

(56) References Cited

U.S. PATENT DOCUMENTS

| | | | | |
|---|---|---|---|---|
| 2007/0083857 A1* | 4/2007 | Jiang | ...................... | G06F 8/456 717/130 |
| 2010/0131934 A1* | 5/2010 | Kim | ...................... | G06F 8/447 717/137 |
| 2015/0242193 A1* | 8/2015 | Kee | ........................... | G06F 8/34 717/145 |

OTHER PUBLICATIONS

MMCDOLE, "Assembly Code vs Machine Code vs Object Code?", retrieved from <http://stackoverflow.com/questions/466790/assembly-code-vs-machine-code-vs-object-code> on Apr. 26, 2017, 5 Pages.
Cytron et al., "Compact Representations for Control Dependence", retrieved from <http://citeseerx.ist.psu.edu/viewdoc/download?doi=10.1.1.106.736&rep=rep1&type=pdf>, 1990, pp. 337-351.

(Continued)

*Primary Examiner* — Wynuel S Aquino
(74) *Attorney, Agent, or Firm* — Barnes & Thornburg LLP

(57) ABSTRACT

An apparatus for automatically converting a control flow program into a data flow program comprises a non-transitory machine-readable medium and a translator stored in the machine-readable medium. The translator, when executed by a data processing system, enables the data processing system to (a) automatically generate a control dependency graph for a control flow program, (b) automatically generate a data flow graph based at least in part on the control dependency graph, and (c) automatically generate a data flow program based at least in part on the data flow graph. In one embodiment or scenario, the translator may also automatically insert a switch instruction into the data flow program, in response to a determination that a variable of the control flow program is defined in one control dependency region and used in a different control dependency region. Other embodiments are described and claimed.

22 Claims, 8 Drawing Sheets

(56) References Cited

OTHER PUBLICATIONS

Anderson, Kenneth M., "Lecture 15: Control Dependence Graphs", retrieved from <https://www.cs.colorado.edu/~kena/classes/5828/s00/lectures/lecture15.pdf>, 2000, 12 Pages.
Clang, "Clang: A C Language Family Frontend for LLVM", retrieved from <https://clang.llvm.org/>, on Apr. 26, 2017, 2 Pages.
Clang, "Clang vs Other Open Source Compilers", retrieved from <https://clang.llvm.org/comparison.html>, on Apr. 26, 2017, 4 Pages.
Wikipedia, "Compiler", retrieved from <https://en.wikipedia.org/wiki/Compiler>, on Apr. 26, 2017, 11 Pages.
Wikipedia, "Control Flow Diagram", retrieved from <https://en.wikipedia.org/wiki/Control_flow_diagram>, on Apr. 25, 2017, 3 Pages.
Wikipedia, "Data Flow Diagram", retrieved from <https://en.wikipedia.org/wiki/Data_flow_diagram>, on Apr. 25, 2017, 3 Pages.
Wikipedia, "Dataflow Architecture", retrieved from <https://en.wikipedia.org/wiki/Dataflow_architecture>, on Apr. 25, 2017, 3 Pages.
Wikipedia, "Dependence Analysis", retrieved from <https://en.wikipedia.org/wiki/Dependence_analysis#Control_dependencies>, on Apr. 25, 2017, 3 Pages.
Wikipedia, "Integrated Development Environment", retrieved from <https://en.wikipedia.org/wiki/Integrated_development_environment>, on Apr. 26, 2017, 5 Pages.
Wikipedia, "LLVM", retrieved from <https://en.wikipedia.org/wiki/LLVM>, on Apr. 25, 2017, 7 Pages.
LLVM, "The LLVM Target-Independent Code Generator", retrieved from <http://llvm.org/docs/CodeGenerator.html>, on Apr. 25, 2017, 35 Pages.

\* cited by examiner

TECHNOLOGY TO USE CONTROL DEPENDENCY GRAPHS TO CONVERT CONTROL FLOW PROGRAMS INTO DATA FLOW PROGRAMS

STATEMENT REGARDING GOVERNMENT SUPPORT

This invention was made with Government support under contract number H98230A-13-D-0124 awarded by the Department of Defense. The Government has certain rights in this invention.

TECHNICAL FIELD

This disclosure pertains in general to technology for converting a computer program from one architecture to another. In particular, this disclosure pertains to methods and apparatus that use control dependency graphs to automatically convert control flow programs into data flow programs.

BACKGROUND

A data processing system (DPS) may include hardware and software components. The hardware components may include a processor, random access memory (RAM), and nonvolatile storage (NVS). The software components may include many different kinds of computer programs. The DPS may run the software components by copying them from the NVS to RAM and then executing them on the processor.

A processor may be described in terms of its design architecture and in terms of its instruction set architecture (ISA). Conventional processors typically follow the von Neumann architecture, the Harvard architecture, the modified Harvard architecture, or similar architectures. According to any such architecture, the design architecture for the processor or processing unit may include an arithmetic logic unit and a control unit, with the control unit containing a program counter. To start executing a program, the address of the first instruction in that program is loaded into the program counter. The processor then fetches the instruction at that address, executes that instruction, and increments the program counter to point to the next sequential instruction in the program. The processor may repeat this fetch cycle until the last instruction of the program has been executed. However, the program may use a control transfer instruction (e.g., a branch instruction) to alter the execution sequence. A control transfer instruction may also be referred to as a "control flow instruction." For instance, a branch instruction (or another control flow instruction) may cause the processor to replace the content of the program counter with the address of an instruction other than the next sequential instruction. Additionally, a control flow instruction may make modification of the program counter conditional on the truth of some assertion (e.g., branch if the content of a specified register does not equal zero). Consequently, the program may execute different sequences of instructions under different conditions. Some common control flow instructions include conditional instructions (e.g., if then else) and loop instructions (e.g., for, while).

For purposes of this disclosure, a computer instruction for directly controlling or altering the flow of control may be referred to as a "control flow instruction." Many different languages provide for many different kinds of control flow instructions. A small sample of control flow instructions includes, without limitation, instructions such as (a) if then else (b) for (c) while (d) branch, (e) branch if equal.

Similarly, computer language that includes control flow instructions may be referred to as a "control flow language," and a computer program that is implemented or written in a control flow language may be referred to as a "control flow program." Likewise, a processor that supports one or more control flow languages or programs may be referred to as a "control flow processor" and as having a "control flow architecture."

DESCRIPTION OF EMBODIMENTS

Figure 1:
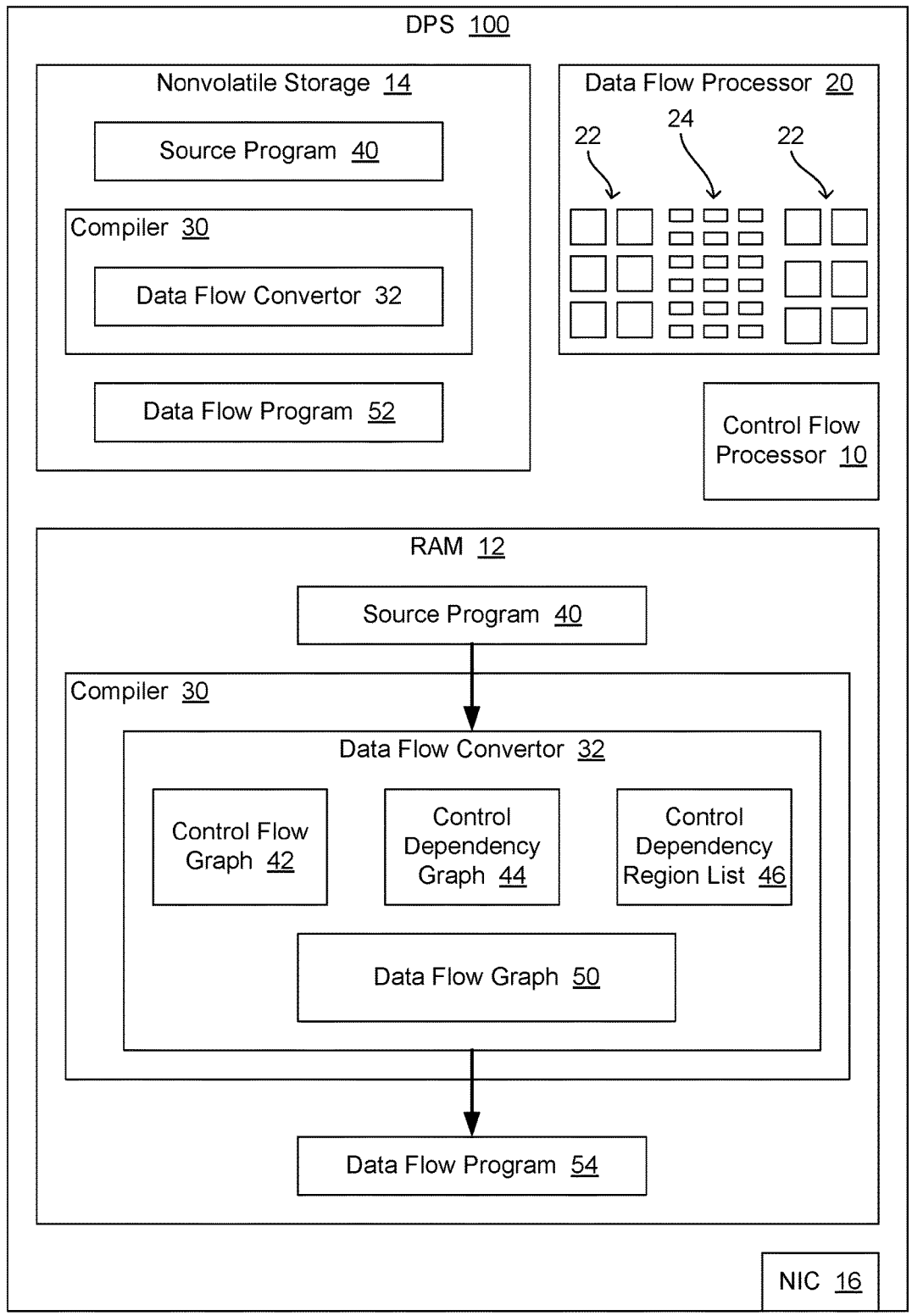
FIG. 1 is a block diagram of an example embodiment of a data processing system with components including a data flow processor and a data flow convertor.

Conventional processors are typically control flow processors. However, computer engineers are currently developing processors that enable programs to execute without control flow instructions. In particular, engineers are developing a type of processor that does not use a program counter to control the flow of execution of a program. More specifically, instead of controlling the flow of execution based on a program counter, the processor controls the flow of execution based on the availability of data referenced by the instructions of the program. This type of design may be referred to as a "data flow architecture." Similarly, a processor with a data flow architecture may be referred to as a "data flow processor." Also, for purposes of this disclosure, a data flow language is a computer language with instructions for manipulating data, but no control flow instructions. Similarly, a data flow instruction is a computer instruction from a data flow language, and a data flow program is a computer program embodied or encoded in a data flow language. Accordingly, a data flow processor is capable of executing data flow programs, and data flow programs do not use control flow instructions.

In order for a computer program to execute directly on a processor, the architecture for the processor may require the program to be expressed in machine language or machine code. The machine language version or expression of a program may be considered the lowest level expression. However, software developers usually write or create programs in a higher level language, such as assembly, C, etc. The highest level expression of a program may be referred to as the "source code" for that program. The software developers may then use utilities such as compilers, assemblers, and linkers to convert the source code for a program into lower level expressions of that program. Such utilities may be referred to in general as "translators."

In addition, software developers may use translators to translate code from one language to another, with neither of those languages necessarily being lower-level than the other. The code that serves as input may nevertheless be referred to as the "source code" or the "source program," and the code that is produced may be referred to as the "object code."

In addition or alternatively, a utility referred to as an "interpreter" may be used to execute a high level expression of a program on a processor. For instance, a machine language expression of the interpreter may execute directly on the processor, and the high level expression of the program may execute on the interpreter.

To create a computer program that performs a particular task or set of tasks, it may be easier for a software developer to write the program as a control flow program than as a data flow program. Additionally, many different types of control flow programs already exist, and it may be desirable to convert many of those programs into data flow programs, to enable the converted programs to run on data flow processors. As indicated above, the present disclosure pertains to technology for automatically converting control flow programs into data flow programs. In particular, as described in greater detail below, the present disclosure pertains to methods and apparatus that use control dependency graphs to convert control flow programs into data flow programs.

In particular, a utility known as a data flow convertor may be used to convert a control flow program into a data flow program. And as described in greater detail below, as part of the conversion process, the data flow convertor may assign different parts of the control flow program to different control dependency regions. The data flow convertor may then consider each definition and each usage of each variable in the control flow program. If the definition is in a different control dependency region than the usage, the data flow convertor may determine that a special data flow instruction is needed. As indicated below, that instruction may be referred to as a "switch" instruction. As described in greater detail below, the switch instruction may route a value to a particular channel, based on a branch condition of the definition region. Moreover, the approach described herein may allow the data flow convertor to avoid inserting unnecessary data flow instructions, thereby keeping the data flow graph small.

This disclosure presents an example embodiment in which the data flow convertor is implemented as part of a compiler. However, as described in greater detail below, the data flow convertor may be implemented as part of a different type of utility or as a standalone utility in other embodiments.

FIG. 1 is a block diagram of an example embodiment of a data processing system 100 with components including a data flow processor (DFP) 20 and a data flow convertor 32. DFP 20 is a processor that controls the flow of execution based on the availability of data referenced by the instructions of a computer program, rather than controlling the flow of execution based on a program counter. In other words, data flow processor 20 uses a data flow architecture. In the embodiment of FIG. 1, DFP 20 includes numerous different processing elements (PEs) 22. A PE in a data flow processor may also be referred to as a "data flow core" (DFC). Accordingly, DFCs 22 are able to execute data flow instructions. DFP 20 also includes numerous different communication channels 24 which enable at least some of the DFCs to communicate with at least some others of the DFCs.

Also, for purposes of this disclosure, a communication channel is a data storage component within a DFP that can be written to and read from by multiple DFCs. For purposes of this disclosure, unless the context clearly dictates otherwise, "channel" should be understood as referring to a communication channel in a DFP. A channel may operate in some respects like a register. However, the primary purpose of a channel is typically to serve as a buffer to connect input to its consumer. Typically, data flow instructions either consume or produce at least one channel.

As indicated above, the flow of execution in DFP 20 is based on the availability of the data that feeds in to the instructions of the data flow program. Thus, each DFC 22 in DFP 20 is driven by its inputs.

In one embodiment, each DFC 22 is relatively simple, with a single core supporting only 16 or fewer instructions. Also different DFCs in DFP 20 may be capable of executing different sets of data flow instructions. Accordingly, DFP 20 may also be referred to as a "data flow accelerator" (DFA). Thus, a DFA is an integrated circuit with numerous DFCs and numerous channels to interconnect the DFCs.

Furthermore, a DFA may be dynamically configurable. For instance, DFP 20 may include a DFA manager and various field programmable gate arrays (FPGAs) or similar features, and the DFA manager may use those features to dynamically configure or reconfigure the number of DFCs 22, the types of DFCs 22, the number of channels 24, and other aspects of DFP 20. The DFA manager may dynamically configure DFP 20 based on a data flow graph, for instance. And to change the type of a DFC, the DFA manager may configure one or more FPGAs (or similar features) in the DFC to change the DFC from an "ADD" core for one application to a "MULTIPLY" core for another application. In one embodiment or scenario, DFP 20 may include hundreds (e.g., 512) of DFCs and hundreds (e.g., 512) of channels. In other embodiments or scenarios, DFP 20 may have a larger or smaller number of DFCs and channels. And as indicated above, in one embodiment or scenario, the number of DFCs and channels may be dynamically changed for different applications.

In the embodiment of FIG. 1, DPS 100 also includes a conventional control flow processor (CFP) 10, as well as NVS 14 and RAM 12. CFP 10 and DFP 20 may be able to read from and write to RAM 12 and NVS 14.

NVS 14 includes a compiler 30, and compiler 30 includes a data flow convertor 32. Compiler 30 may execute on CFP 10. For instance, CFP 10 may copy compiler 30 from NVS 14 into RAM 12, and CFP 10 may then execute compiler 30 from RAM 12. In the embodiment of FIG. 1, NVS 14 also includes a control flow program 40 that is to be converted into a data flow program 54. That control flow program is illustrated as source program 40. As described in greater detail below, when compiler 30 executes, compiler 30 may use data flow convertor 32 to convert source program 40 into data flow program 54. For instance, as illustrated, compiler 30 may copy source program 40 from NVS 14 into RAM 12, and compiler 30 may then use data flow convertor 32 to convert source program 40 into data flow program 54. Data flow program may then execute on DFP 20. In addition or alternatively, compiler 30 may copy data flow program 54 from RAM 12 to NVS 14 for future utilization.

DPS 100 may also include various additional components, such as a network interface controller (NIC) 16 for communicating with other DPSs over a network, etc.

Source program 40 includes various control flow instructions. Data flow program 54 does not include any control flow instructions. However, source program 40 and data flow program 54 are different representations or embodiments of code to accomplish the same task or tasks. Consequently, from one perspective, source program 40 and data flow program 54 may be considered to be different embodiments or implementations of the same program. Additionally, as described in greater detail below, data flow convertor 32 may generate one or more intermediate representations (IRs) of that program. Such IRs may also be considered to be different embodiments or implementations of the same program.

As indicated above, in the embodiment of FIG. 1, data flow convertor 32 is implemented as part of compiler 30. In one embodiment or scenario, compiler 30 is used to compile programs in advance, producing object code that can be executed later. In an alternative embodiment or scenario, a data flow convertor may be part of a just-in-time (JIT) compiler or interpreter that converts the source code for a program into object code while that program is running. Also, in the embodiment of FIG. 1, compiler 30 generally resides in NVS 14, and DPS 100 loads compiler 30 into RAM 12 and executes compiler 30 from RAM 12 when compiler 30 is needed. In another embodiment, a DPS may run a compiler in a processor without loading the compiler into RAM. For instance, the compiler may run from memory in the processor.

For purposes of this disclosure, a translator is a computer program that reads in another program (the "input code") in one language and outputs a corresponding program (the "output code") in a different language. For instance, compilers and interpreters are types of translators. For purposes of this disclosure, the input code for a translator may be referred to as "source code," and the output code may be referred to as "object code." Also, For purposes of this disclosure, a compiler is a type of translator that accepts a program in a high-level language (e.g., C) as input and outputs a corresponding program in a lower-level language (e.g., assembly code). Additionally, even though FIG. 1 illustrates data flow convertor 32 as part of a compiler, in other embodiments, a data flow convertor may operate as an independent translator, as part of other types of translator (e.g., a source-to-source translator), or as part of another type of program altogether (e.g., a piece of microcode in firmware that does binary translation of control flow code into data flow code). For purposes of this disclosure, a data flow convertor is a program that converts a control flow program into a data flow program. Furthermore, the present disclosure describes a data flow convertor that performs such conversions based on input that includes a control dependency graph.

Figure 2:
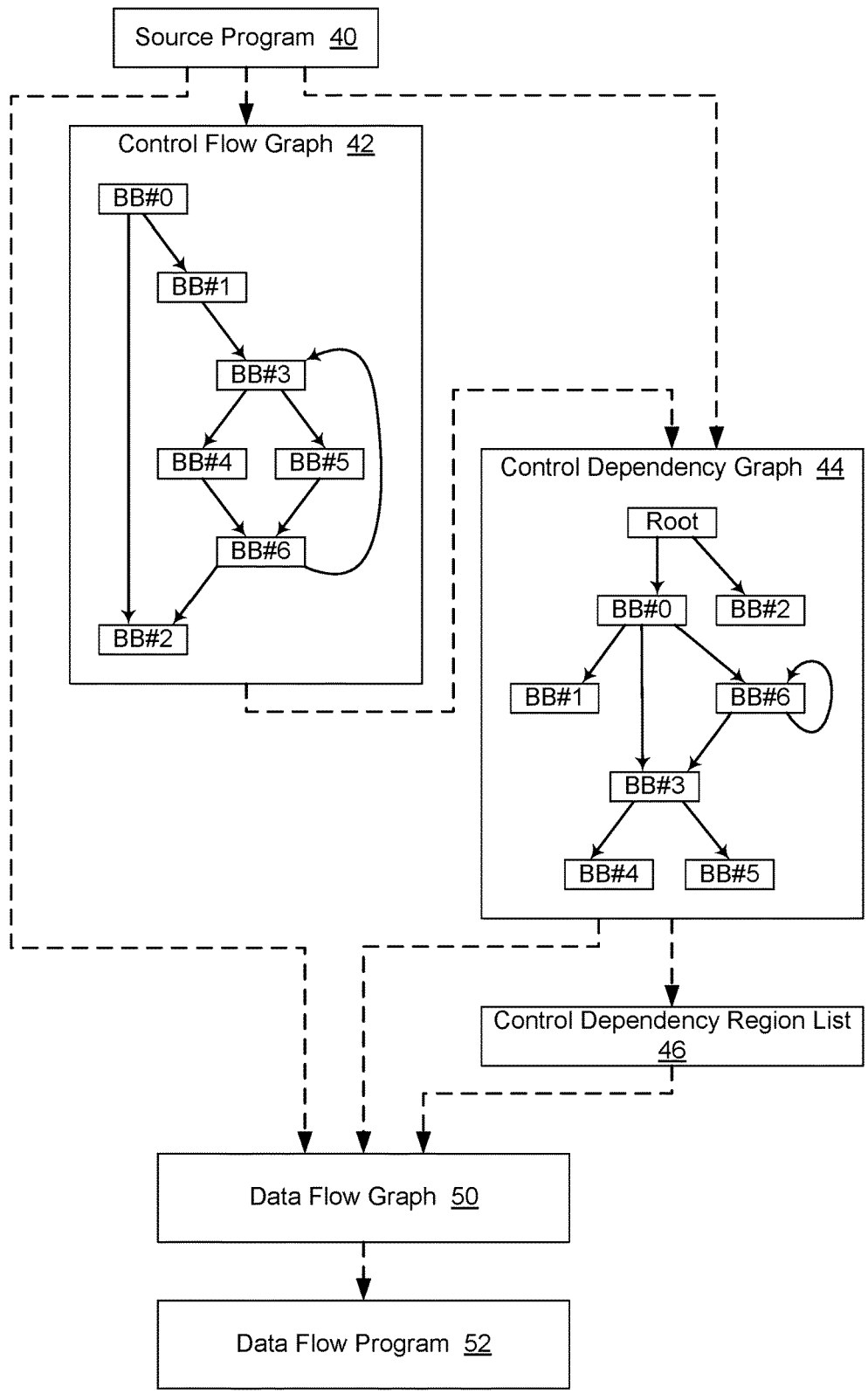
FIG. 2 is a block diagram with example embodiments of various graphs used by the data flow convertor to convert a control flow program into a data flow program.

FIG. 2 is a block diagram of example embodiments of various graphs and such used by data flow convertor 32 to convert control flow program 40 into data flow program 54. In particular, FIG. 2 illustrates a control flow graph 42, a control dependency graph 44, a control dependency region list 46, and a data flow graph 50.

For purposes of illustration, this disclosure uses pseudocode to depict an example instruction listing for source program 40. In particular, source program 40 may include the following sequence of instructions:

```
1:      float function(float x, int n) {
2:          for (unsigned i = 0; i < n; i++) {
3:              if ( i % 2 == 0 )
4:                  x = x / 2;
5:              else
6:                  x = x / 3;
```

```
7:          end-for;}
8:      return x;}
```

In the above pseudocode, the % operator is a modulo operator. As part of the process of converting source program 40 into control flow program 54, data flow convertor 32 may generate one or more IRs of source program 40. One IR ("IR#1") may contain the following sequence of instructions:

```
1:      float function(float x, int n)
2:      if n < 0
3:          jump loop-end
4:      i = 0
5:      loop-top
6:          if ( i % 2 == 0 )
7:              x = x / 2
8:          else
9:              x = x / 3
10:         i = i + 1
11:         if i < n
12:             jump loop-top
13:     loop-end
14:     return x
```

A subsequent IR ("IR#2") may group instructions from IR#1 into basic blocks (BBs) as follows:

```
BB#0:
    1:      float function(float x, int n)
    2:      if n < 0
    3:          jump loop-end
BB#1 :
    4:          i = 0
BB#3:
    5:      loop-top
    6:          if ( i % 2 == 0 )
BB#4:
    7:              x = x / 2
BB#5:
    8:          else
    9:              x = x / 3
BB#6:
    10:         i = i + 1
    11:         if i < n
    12:             jump loop-top
BB#2:
    13:     loop-end
    14:     return x
```

In the above example, IR#2 may use syntax that is similar to the syntax used for an IR by the compiler infrastructure that is referred to be the names or trademarks of "Low Level Virtual Machine" or "LLVM."

Data flow convertor 32 may then generate control flow graph 42, based on IR#2. For purposes of this disclosure, a control flow graph for a program is a representation of that program which identifies or illustrates all possible or potential transfers of control between the instructions or BBs of the program. For instance, in FIG. 2, control flow graph 42 illustrates the possible control flows for source program 40 as follows:

control may flow from BB#0 either to BB#1 or BB#2;
control may flow from BB#1 only to BB#3;

control may flow from BB#3 either to BB#4 or BB#5;
control may flow from BB#4 only to BB#6;
control may flow from BB#5 only to BB#6;
control may flow from BB#6 either to BB#3 or BB#2; and
control does not pass from BB#2 to any other block.
However, for purposes of illustration, control flow graph 42 is presented in a simplified form. In practice, data flow convertor 32 may include additional elements in the control flow graph (and possibly in one or more IRs for the source program) to deal with boundary cases and other situations. For instance, data flow convertor 32 may insert a "root" BB, an "exit" BB, and an edge from the root BB to the exit BB. Such a root BB may be also referred to as pseudo entry BB. A less simplified version of a control flow graph is described below with regard to FIG. 7.

Furthermore, a control flow graph may be in a textual form or a visual form. FIG. 2 illustrates a visual form of control flow graph 42. In addition or alternatively, data flow convertor 32 may use a textual form for control flow graph 42. Any suitable data structure or combination of data structures may be used to denote a control flow graph in textual form. For instance, data flow convertor 32 may save control flow graph 42 in DPS 100 using one or more records, arrays, pointers, or any other suitable data structure or combination of data structures.

Data flow convertor 32 may then use control flow graph 42 to generate (in a textual form, in a visual form, or in both forms) control dependency graph 44 for source program 40. For purposes of this disclosure, a control dependency graph for a program is a representation of that program which identifies or illustrates some or all control flow dependencies between instructions or BBs in that program, according to a particular definition of "control dependency."

In particular, according to the present disclosure, data flow convertor 32 may use a very particular definition of control dependency to determine which blocks are control dependent on either themselves or on other blocks. That definition may be expressed with the following rules:
1. Given two points (A, B) of a program, if more than one path exists from A to the end, with one path passing through B, and the other not, then B is control dependent on A.
2. A point is (a) an instruction or a basic block or (b) an instance or iteration in a loop of an instruction or a basic block.

Additionally, according to the present disclosure, data flow convertor 32 uses the following rule to generate control dependency graphs:
There is an edge from A to B in the control dependency graph if and only if B is control dependent on A.

Also, for purposes of this disclosure, if point B is control dependent on point A, point A may be referred to as the "parent" of point B. And if point B is directly control dependent on point A, point A may be referred to as the "direct parent" of point B. However, if the control dependency is not immediate (or "direct"), point A may be referred to as the "indirect parent" of point B.

Additionally, since different instances of an instruction or BB in a loop may be considered different points, an instruction or BB may be a parent to itself. For instance, in control dependency graph 44, BB#6 has the following direct parent nodes: BB#0 and BB#6.

Figure 3:
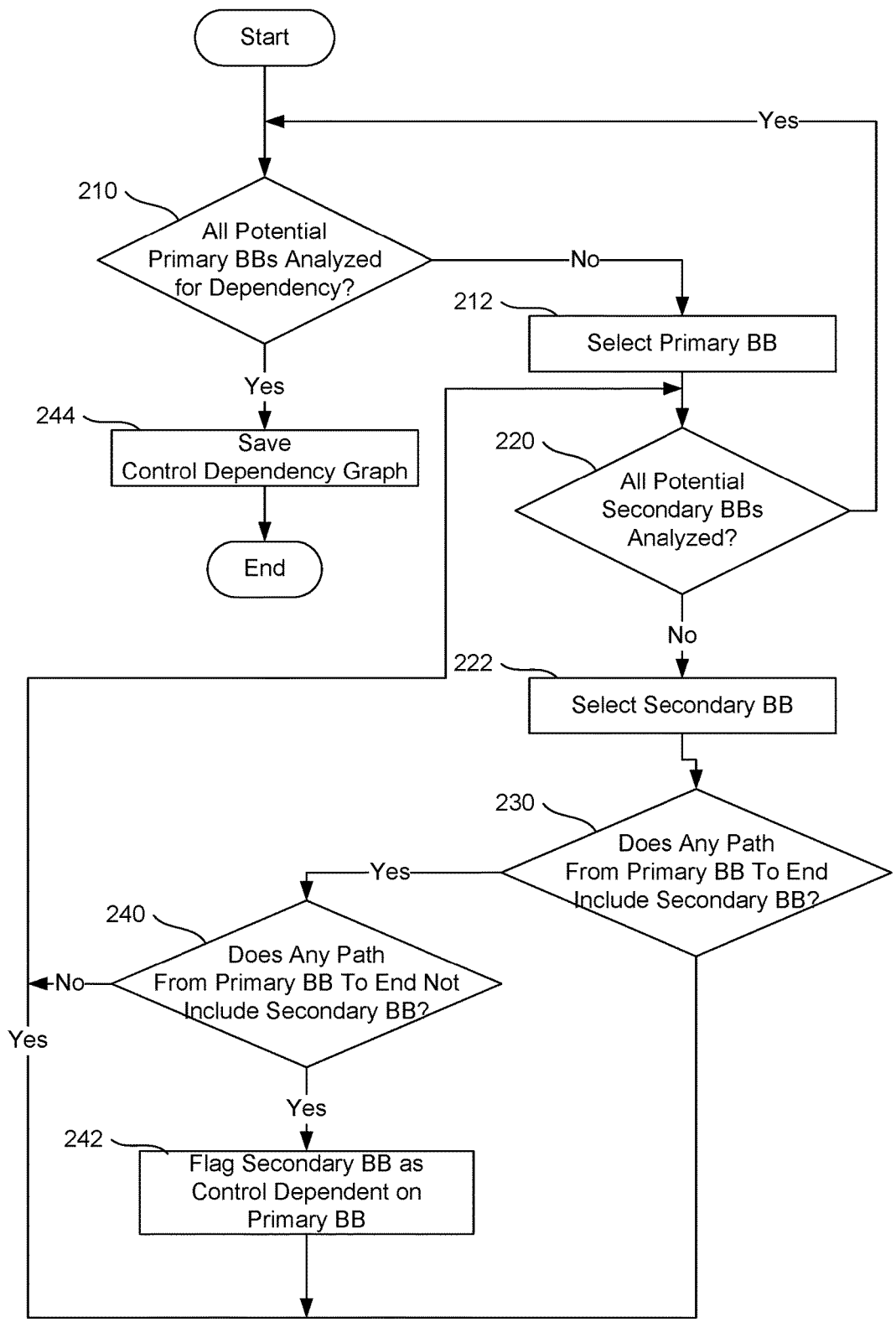
FIG. 3 presents a flowchart of an example embodiment of a process for generating a control dependency graph.

FIG. 3 presents a flowchart of an example embodiment of a process for generating a control dependency graph. For ease of understanding, FIG. 3 illustrates a simplified process. As will be recognized by one of skill in the art, in practice the process may be modified significantly to enhance efficiency, etc. In one embodiment, to generate a control dependency graph, a data flow convertor may use a process like the one described in the article by Ron Cytron et al. entitled "Compact Representations for Control Dependence" (Hereinafter "Cytron"). However, Cytron provides for what might be called "weak regions." By contrast, according to the present disclosure, data flow convertor 32 may use a process which provides for strong regions.

The process of FIG. 3 may start after data flow convertor 32 has generated IR#2 and control flow graph 42. In one embodiment, data flow convertor 32 uses IR#2 and control flow graph 42 to make the determinations illustrated in FIG. 3, as illustrated by the dashed arrows in FIG. 2 leading from source program 40 and control flow graph 42 to control dependency graph 44. As shown at block 210 of FIG. 3, data flow convertor 32 may then start generating control dependency graph 44 by determining whether data flow convertor 32 has analyzed all BBs for dependency. In particular, data flow convertor 32 may determine whether all potential primary BBs in control flow graph 42 have been analyzed yet. If all potential primary BBs have not yet been analyzed, data flow convertor 32 may then select a BB to be considered a primary BB (or "point A"), as shown at block 212. As shown at block 220, data flow convertor 32 may then determine whether all potential secondary BBs have been analyzed in connection with that primary BB. If there are no potential secondary BBs to analyze (or no more potential secondary BBs to analyze), the process may return to block 210 and possibly 212, with data flow convertor 32 possibly selecting a new BB to serve as the primary BB.

However, if there is at least one potential secondary BB to be analyzed, data flow convertor 32 may select a potential secondary BB to be considered the secondary BB (or "point B"), as shown at block 222. As indicated above, the secondary BB may be (a) a BB other than the primary BB or (b) another instance, in a loop, of the primary BB.

As shown at block 230, data flow convertor 32 may then determine whether any path in control flow graph 42 from the primary BB to the end of the program includes the secondary BB. In response to a positive determination, data flow convertor 32 may then determine whether any path from the primary BB to the end of the program does not include the secondary BB, as shown at block 240. In response to positive determinations at block 230 and 240, data flow convertor 32 may flag the secondary BB as control dependent on the primary BB, as shown at block 242. The process of FIG. 3 may then return to block 220, with data flow convertor 32 determining whether all potential secondary BBs have been now analyzed.

Alternatively, the process may return to block 220 in response to a negative determination at block 230 or 240. If additional potential secondary BBs remain to be analyzed, data flow convertor 32 may analyze those BBs as described above. And after all potential secondary BBs have been analyzed, the process may flow from block 220 to block 210, with data flow convertor 32 selecting a new BB to be considered the primary BB, if any such BBs remain to be considered, as indicated above. Once all BBs have been analyzed for dependency, data flow convertor 32 may save the results as control dependency graph 44, as shown at block 244, and the process may end.

For instance, when considering BB#0 as the primary BB and BB#1 as the secondary BB, data flow convertor 32 may determine that a path exists from BB#0 to the end that goes through BB#1 and another path exists from BB#0 to the end without going through BB#1. Consequently, data flow convertor 32 may flag BB#1 as control dependent on BB#0. And when considering one instance or iteration of BB#6 as the primary BB and another instance or iteration of BB#6 as the secondary BB, data flow convertor 32 may determine that a path exists from the first iteration of BB#6 to the end that goes through a second iteration of BB#6 and another path exists from the first iteration BB#6 to the end without going through a second iteration of BB#6. Consequently, data flow convertor 32 may flag BB#6 and control dependent on itself.

Data flow convertor 32 may thus generate control dependency graph 44, and control dependency graph 44 may identify all of the control dependencies between the BBs of source program 40. For instance, control dependency graph 44 indicates that BB#0 and BB#2 from IR#2 are not control dependent on any other BBs. Control dependency graph 44 also identifies the following dependencies:

BB#1 is control dependent on BB#0.
BB#6 is control dependent on itself and BB#0.
BB#3 is control dependent on BB#0 and BB#6.
BB#4 is control dependent on BB#3.
BB#5 is control dependent on BB#3.

Data flow convertor 32 may then identify all of the control dependency regions in source program 40. Furthermore, data flow convertor 32 may use the following rule to define the concept of control dependency region:

A control dependency region is a sequence of one or more basic blocks in a control flow program wherein (a) each basic block in the sequence is directly control dependent on the same parent basic block and (b) each basic block in the sequence has the same execution frequency.

Figure 4:
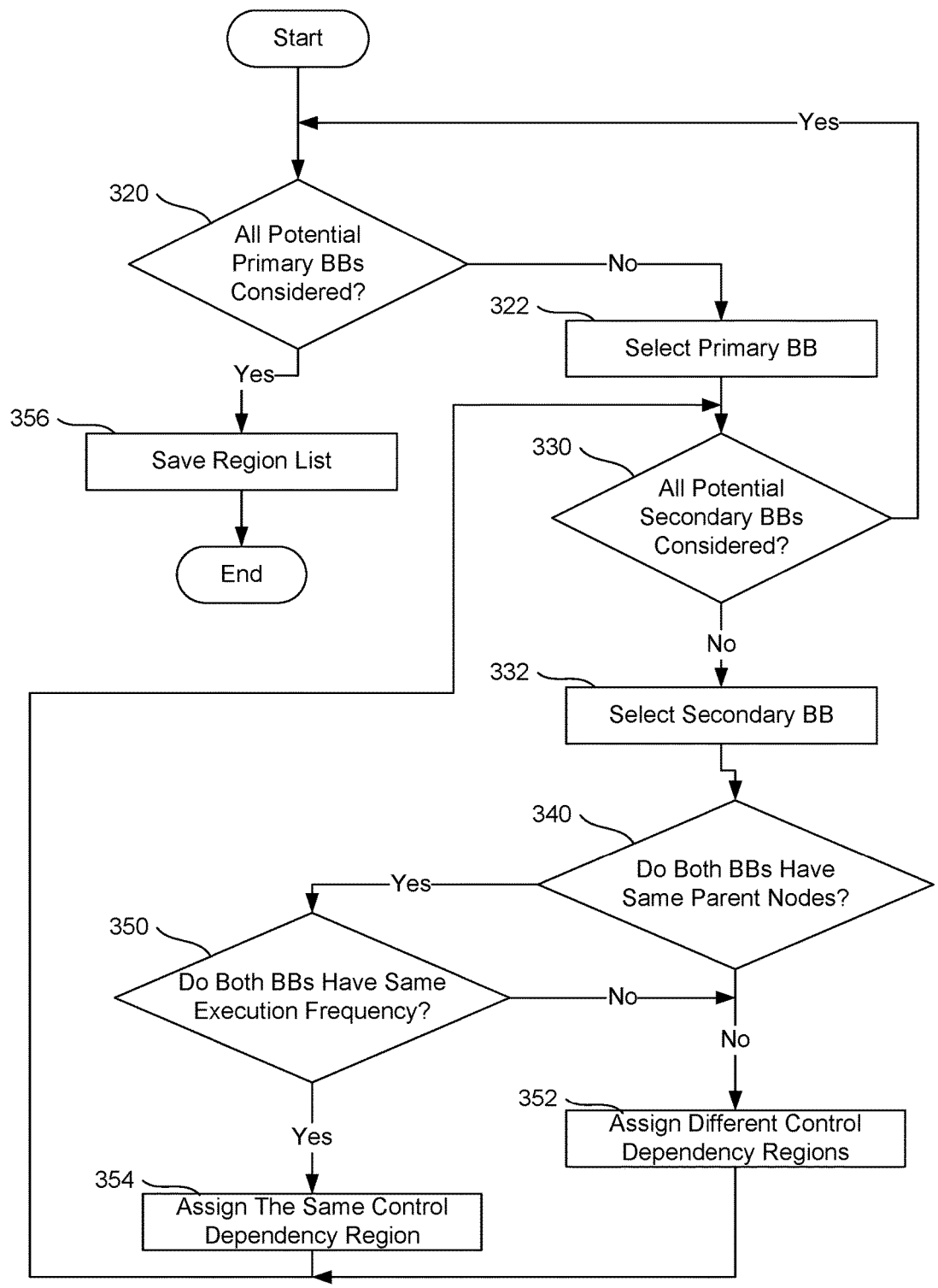
FIG. 4 presents a flowchart of an example embodiment of a process for identifying control dependency regions.

FIG. 4 presents a flowchart of an example embodiment of a process for identifying control dependency regions. In one embodiment, data flow convertor 32 uses control dependency graph 44 to make the determinations illustrated in FIG. 4, as illustrated in FIG. 2 by the dashed arrow leading from control dependency graph 44 to control dependency region list 46. The process of FIG. 4 may start at block 320 with data flow convertor 32 determining whether all potential primary BBs in control dependency graph 44 have been considered. If any potential primary BBs remain to be considered, data flow convertor 32 may select one of those BBs to be considered a primary BB, as shown at block 322. As shown at block 330, data flow convertor 32 may then determine whether all potential secondary BBs have been considered in connection with that primary BB. If all potential secondary BBs have already been considered, the process may return to block 320, and data flow convertor 32 may proceed to block 322 to select a new primary BB if any potential primary BBs remain to be considered.

However, referring again to block 330, if any potential secondary BBs remain to be considered, data flow convertor 32 may select one of those BBs to be considered a secondary BB, as shown at block 332. As shown at block 340, data flow convertor 32 may then determine whether the primary and secondary BBs have identical sets of parent nodes in control dependency graph 44. In response to a positive determination, data flow convertor 32 may then determine wherein the primary and secondary BBs have the same execution frequency, as shown at block 350. For example, in one embodiment, control dependency graph 44 includes data to identify loop and branch conditions and other aspects of source program 40, a data flow convertor 32 uses that data to determine execution frequency. For instance, control dependency graph 44 may include data to identify features like those shown in data flow graph 50. As shown at block 354, if the primary and secondary BBs have the same parent nodes and the same execution frequency, data flow convertor 32 may assign the same control dependency region to the primary BB and the secondary BB. However, as shown at block 352, if the primary and secondary BBs do not have the same parent nodes and the same execution frequency, data flow convertor 32 may assign the primary BB and the secondary BB to different control dependency regions.

The process may then return to block 320, with data flow convertor 32 assigning each remaining BB to a control dependency region, as indicated above. After assigning all BBs to regions, data flow convertor 32 may save the resulting control dependency region list 46, as shown at block 356, and the process may then end.

In one embodiment or scenario, data flow convertor 32 may assign each BB for source program 40 to a separate control dependency region, because none of the BBs have both (a) identical parent BBs and (b) the same execution frequency. However, in other embodiments or scenarios, two or more BBs may belong to the same control dependency region. For instance, a control flow program may include two basic blocks A and C that do not loop and an intervening basic block B that does loop, and basic blocks A and C may belong to the same control dependency region.

Data flow convertor 32 may then use control dependency graph 44, control dependency region list 46, and other data sources to generate a data flow graph that corresponds to source program 40.

Figure 5:
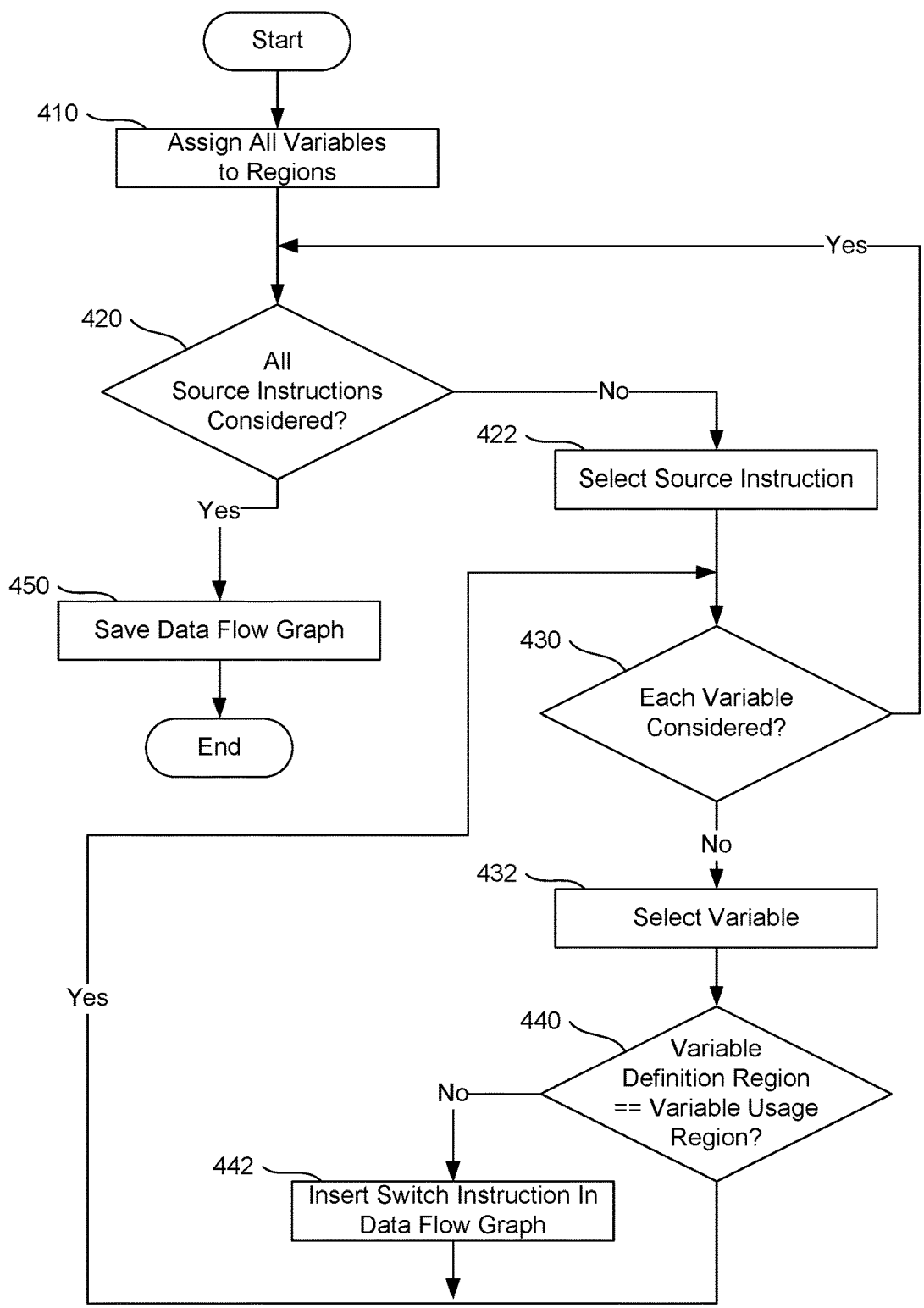
FIG. 5 presents a flowchart of an example embodiment of a process for generating a data flow graph.

FIG. 5 presents a flowchart of an example embodiment of a process for generating a data flow graph. In one embodiment, data flow convertor 32 uses IR#2, control dependency graph 44, and control dependency region list 46 to make the determinations illustrated in FIG. 5, as illustrated in FIG. 2 by the dashed arrows leading from source program 40, control dependency graph 44, and control dependency region list 46 to data flow graph 50. The process of FIG. 5 may start at block 410 with data flow convertor 32 assigning a region to each usage of each variable in source program. For instance, data flow convertor 32 may use IR#2 to identify each usage of each variable and control dependency graph 44 to determine which region each usage resides in. As shown at block 420, data flow convertor 32 may then determine whether all of the source instructions in IR#2 have already been analyzed. If any source instructions have not been analyzed yet, data flow convertor 32 may select a source instruction to be analyzed, as shown at block 422. As shown at block 430, data flow convertor 32 may then determine whether all of the variables in the selected instruction have already been analyzed. If any of those variables have not been analyzed yet, data flow convertor 32 may select a variable to be analyzed, as shown at block 432.

As shown at block 440, data flow convertor 32 may then determine whether the region where the variable was defined is the same as the region where the variable is being used. If those regions are different, data flow convertor 32 may insert a switch instruction into data flow graph 50, as shown at block 442. (The switch instruction is described in greater detail below.) If those regions are the same, however, data flow convertor 32 may return from block 440 to block 430, with data flow convertor 32 selecting another variable (if any remain) from the selected instruction to be analyzed as indicated above.

Once all variables from the selected instruction have been analyzed, the process may return from block 430 to block 420, with data flow convertor 32 selecting another instruction (if any remain) to be analyzed, as indicated above. Once all instructions and all variables in those instructions have been considered, data flow convertor 32 may save the results as data flow graph 50, as shown at block 450, and the process may then end.

For purposes of this disclosure, a switch instruction is an instruction in the instruction set for DFP 20 that (a) names one control channel, one input channel, and two output channels; (b) consumes the values from the control channel and the input channel; (c) selects one of the output channels, based on the control channel; and (d) produces the value from the input channel on the selected output channel. A switch instruction may also be referred to simply as a "switch." In one embodiment, the switch instruction may use the following syntax:

C1, C2=Switch Ctrl, Ci wherein:
Ci is the input channel,
Ctrl is the control channel, and
C1, C2 are the output channels.

Also, the switch instruction may, in effect, apply the following semantics:

| If (CTRL) |
| C2 = Ci |
| Else |
| C1 = Ci |

Also, for purposes of this disclosure, a pick instruction is an instruction in the instruction set for DFP 20 that (a) names one control channel, two input channels, and one output channel; (b) selects one of the input channels, based on the control channel; (c) consumes the values from the control channel and the selected input channel; and (d) produces the value from the selected input channel on the output channel. A pick instruction may also be referred to simply as a "pick."

Figure 6:
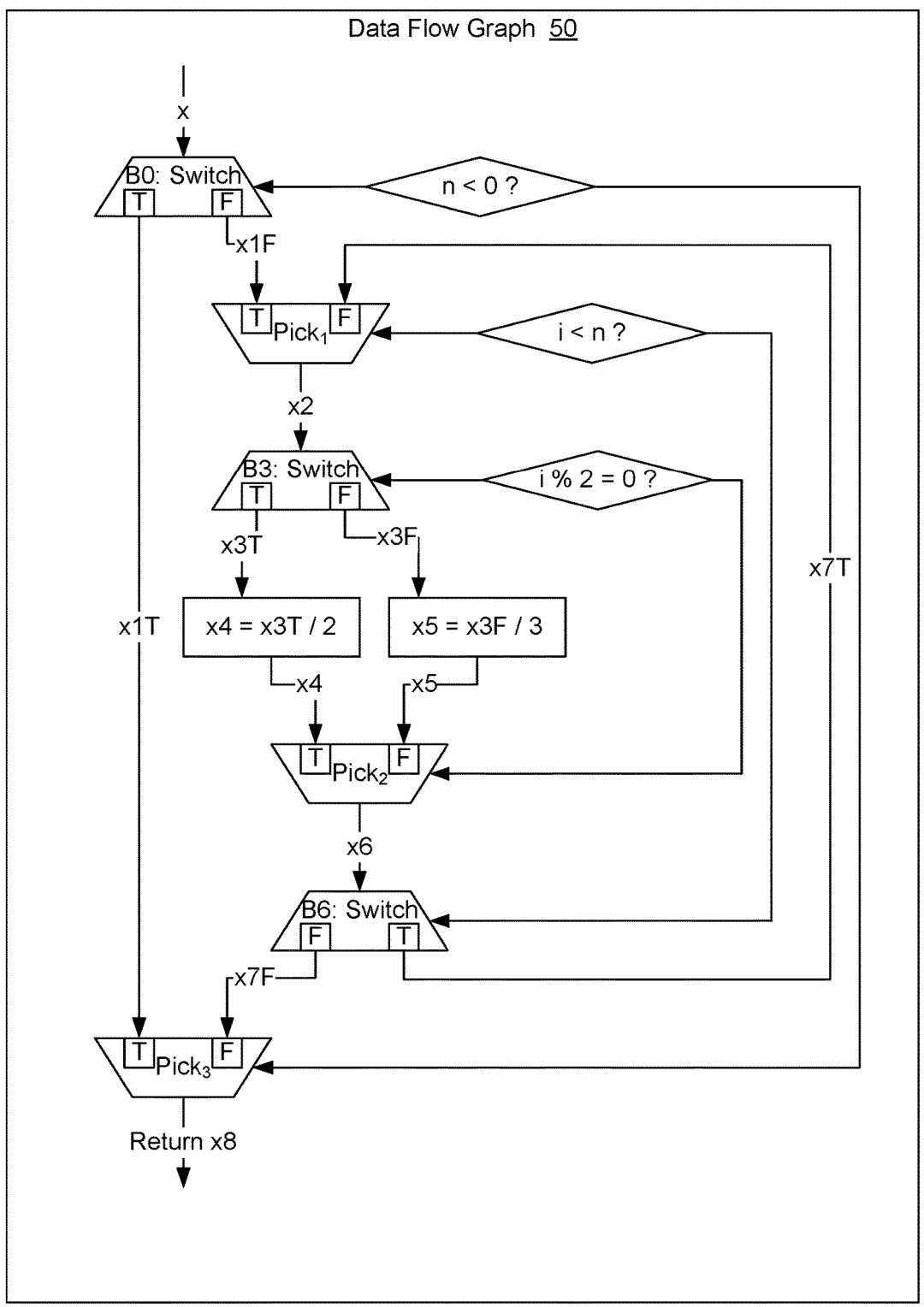
FIG. 6 presents an example embodiment of a data flow graph.

FIG. 6 presents an example embodiment of data flow graph 50. As indicated above, data flow convertor 32 may generate data flow graph 50 based on input data such as control flow graph 42, using a process like the one illustrated in FIG. 5. In particular, data flow graph 50 illustrates a portion of data flow graph 50 pertaining to the variable x. Data flow graph 50 may also include additional information (not illustrated) pertaining to all of the other variables in source program 40, or all of the variables in an intermediate representation of source program 40 (e.g., IR#2).

In FIG. 6, each switch instruction (e.g., "B0: Switch") is illustrated with a trapezoid with a wide base. Also, FIG. 6 includes diamonds to represent Boolean operations. FIG. 6 also includes rectangles to represent operations such as assignment and arithmetic. FIG. 6 also includes pick instructions. Each pick instruction is illustrated with a trapezoid with a wide base. Each pick instruction is also provided with a different subscript (e.g., $Pick_1$), for ease of reference.

FIG. 6 also includes various communication channel identifiers (CCIs) to identify channels produced or consumed by instructions. In FIG. 6, each CCI is illustrated with an arrow that leads from the instruction that produces the value for that CCI to the instruction that consumes the value for that CCI. For purposes of illustration, FIG. 6 illustrates (a) control channel CCIs entering picks and switches from the side, (b) input (or "consumed") CCIs entering from the top, and (c) output (or "produced") CCIs leaving from the bottom. Also, for purposes of illustration, FIG. 6 labels input channels for picks and output channels for switches with "T" and "F" to represent channels selected based on Boolean control channels. But other types of control channels may be used in other embodiments or scenarios. Also, in one embodiment, the communication channels are insensitive to latency. Such communication channels may be referred to as "latency insensitive channels" (LICs).

Also, in FIG. 6, each switch is labeled with the identifier for the BB that contains the instruction or instructions which data flow convertor 32 has, in effect, converted or translated into that switch. For instance, "B0: Switch" identifies BB#0 from IR #2 as the BB that corresponds to that switch.

After generating data flow graph 50, data flow convertor 32 may then use data flow graph 50 to generate data flow program 54. The following pseudocode illustrates an example data flow program 54 based on data flow graph 50:

```
Final Assembly code:
    .text
    # .processor autounit
    .version 0,6,0
    .set implicitextern
    .unit sxu
    .globl    function
    .entry    function
function:
{
    .result .reg .i32 %r0
    .param .reg .i32 %r2
    .param .reg .i32 %r3
    .lic .i1 %ci1__0
    .lic .i1 %ci1__1
    .lic .i1 %ci1__3
    .lic .i32 %ci32__0
    .lic .i32 %ci32__1
    .lic .i32 %ci32__2
    .lic .i32 %ci32__3
    .lic .i32 %ci32__4
    .lic .i32 %ci32__5
    .lic .i32 %ci32__6
    .lic .i32 %ci32__7
    .lic .i32 %ci32__8
    .lic .i32 %ci32__9
    .lic .i32 %ci32__10
    .lic .i32 %ci32__11
    .lic .i32 %ci32__12
    .lic .i32 %ci32__13
    .lic .i32 %ci32__14
    .lic .i32 %ci32__15
    .lic .i32 %ci32__16
    .lic .i32 %ci32__17
    .lic .i32 %ci32__18
    .lic .i32 %ci32__19
    .lic .i32 %ci32__20
    mov64 %ci32__6, %r3
    mov32 %ci32__0, 0
    mov64 %ci32__4, %r2
    .unit    alu
    cmpeq32         %ci1__1, %ci32__6, 0
    .unit    vir
    switch32        %ci32__1, %ign, %ci1__1, %ci32__0
    .unit    vir
    switch32        %ci32__2, %ci32__3, %ci1__1, %ci32__4
    .unit    vir
    switch32        %ci32__5, %ign, %ci1__1, %ci32__6
    .unit    vir
    .curr    %ci1__0;        .value 1;        .avail 0
    .unit    vir
    pick32 %ci32__9, %ci1__0, %ci32__10, %ci32__5
    .unit    vir
    pick32 %ci32__11, %ci1__0, %ci32__12, %ci32__1
    .unit    vir
    pick32 %ci32__13, %ci1__0, %ci32__14, %ci32__2
    .unit    vir
    switch32        %ci32__15, %ci32__16, %ci32__11, %ci32__13
    .unit    fma
    mulf32 %ci32__17, %ci32__15, 0x3f000000, ROUND_NEAREST
    .unit    vir
    pick32 %ci32__19, %ci32__11, %ci32__17, %ci32__18
    .unit    alu
    add32 %ci32__20, %ci32__11, 1
    .unit    alu
```

-continued

```
    cmpeq32      %ci1_3, %ci32_9, %ci32_20
    .unit    vir
    switch32     %ci32_14, %ci32_8, %ci1_3, %ci32_19
    .unit    vir
    switch32     %ci32_12, %ign, %ci1_3, %ci32_20
    .unit    vir
    switch32     %ci32_10, %ign, %ci1_3, %ci32_9
    .unit    alu
    mov1     %ci1_0, %ci1_3
    .unit    div
    divf32 %ci32_18, %ci32_16, 0x40400000, ROUND_NEAREST
    .unit    vir
    pick32 %ci32_7, %ci1_1, %ci32_8, %ci32_3
    .unit    sxu
    mov64 %r0, %ci32_7
    ret      %ra
}
    .ident             "clang version 4.0.0 "
    .section           ".note.GNU-stack","",@progbits
```

Figure 7:
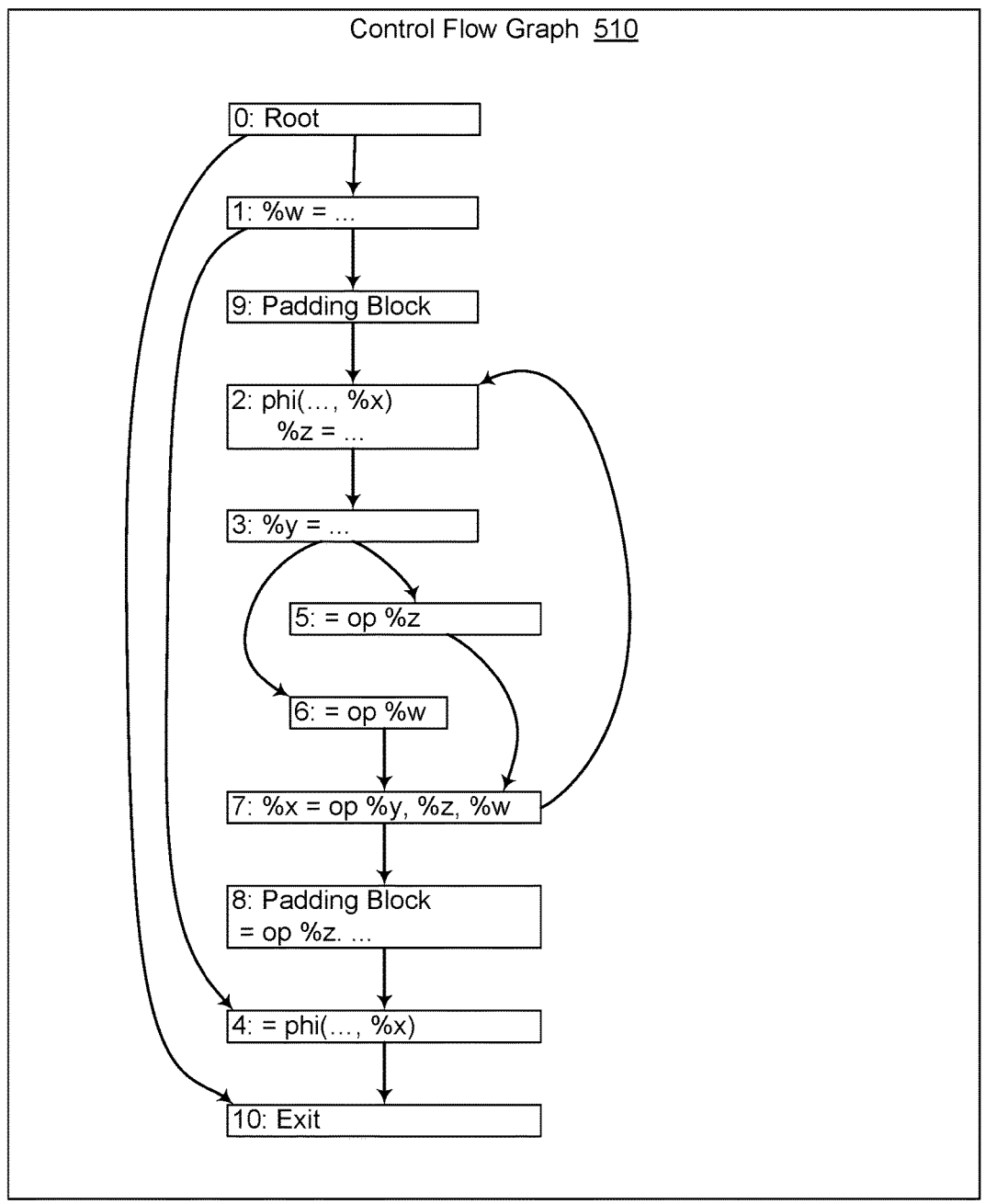
FIG. 7 presents another example embodiment of a control flow graph.

FIG. 7 presents another example embodiment of a control flow graph to further illustrate how data flow convertor 32 works. In FIG. 7, the control flow graph 150 is less simplified than control flow graph 42 in FIG. 2. For instance, control flow graph 150 includes eleven BBs, including the BBs labeled "1" through "9," as well as a pseudo entry root BB labeled "0" and an exit BB labeled "10." The BBs correspond, in general, to source code which is not illustrated. However, each BB includes text to identify the type of operation or operations to be performed by that BB. Also, the text in the BBs is pseudocode in which single letters with the prefix of % (e.g., "% x") denote virtual registers, and the string "phi" denotes a pseudo function. Also, although assignments may generally take the form of "% a=% b op % c" (where "op" can be any kind of binary operator, such as ADD, MUL, DIV), the pseudocode may omit the destination (e.g., "% a") when one or more operands used by the assignment are relevant to the discussion and the destination is not as relevant. Similarly, the destination for a function may be omitted when one or more variables used by the function are relevant to the discussion and the destination is not as relevant.

In particular, control flow graph 510 shows the control flow as follows:
    control may pass from 0 either to 1 or to 10
    control may pass from 1 either to 9 or to 4
    control passes from 9 to 2
    control passes from 2 to 3
    control may pass from 3 either to 5 or to 6
    control passes from 5 to 7
    control passes from 6 to 7
    control may pass from 7 either to 8 or to 2
    control passes from 8 to 4
    control passes from 4 to 10
Also, control flow graph 510 shows that % x is defined in 2 and used in 7 and 4.

Figure 8:
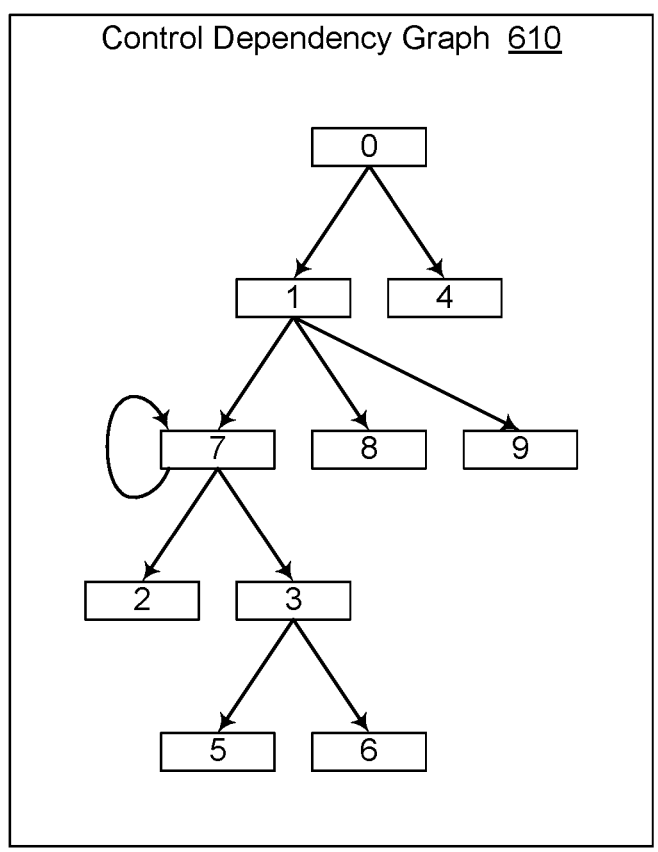
FIG. 8 presents another example embodiment of a control dependency graph.

FIG. 8 presents another example embodiment of a control dependency graph to further illustrate how data flow convertor 32 works. In particular, FIG. 8 illustrates a control dependency graph 610 generated by data flow convertor 32 based on control flow graph 510. FIG. 8 illustrates, for instance, that blocks 1 and 4 are not control dependent on any other blocks, that block 7 is control dependent on itself an on block 1, etc.

In one embodiment or scenario, data flow convertor 32 may assign each BB in control dependency graph 610 to a separate control dependency region. For instance, if data flow convertor 32 determines that the loop from 7 to 2 in control flow graph 510 could be an infinite loop, data flow convertor 32 may determine that BBs 1 and 4 do not have the same execution frequency, and data flow convertor 32 may therefore assign BBs 1 and 4 to different control dependency regions. Consequently, data flow convertor 32 may determine that none of the BBs have both (a) identical parent BBs and (b) the same execution frequency.

In another embodiment or scenario, data flow convertor 32 may assign each BB in control dependency graph 610—other than BBs 1 and 4—to a separate control dependency region, and data flow convertor 32 may assign BBs 1 and 4 to the same control dependency region. For instance, if data flow convertor 32 can determine that the loop from 7 to 2 in control flow graph 510 is not an infinite loop, data flow convertor 32 may assign BBs 1 and 4 to the same control dependency region, because those BBs have (a) identical parent BBs and (b) the same execution frequency.

The following text describes how data flow convertor 32 may use control dependency graph 610 to generate a data flow graph and a corresponding data flow program. For example, data flow convertor 32 may determine that (a) % z is used in 7 and defined in 2, and (b) 7 is not control dependent on 2. Consequently data flow convertor 32 may determine that no switch is needed for % z used in 7.

Also, data flow convertor 32 may determine that (a) % w is used in 7 and defined in 1, and (b) 7 is control dependent on 1. (Or more generally, data flow convertor 32 may determine whether 1 dominates any block that 7 is control dependent on.) Consequently, data flow convertor 32 may determine that a switch is needed for % w used in 7. Data flow convertor 32 may then perform a bottom-up walk of control dependency graph 610 to find the closest block that 7 is control dependent on, to insert switch at that block. Data flow convertor 32 may then insert a switch at that block. In the embodiment of FIG. 8, 7 is directly control dependent on 1. Consequently, data flow convertor 32 may insert a switch for % w at 1.

Using the same kind of approach, for % w used in 6, data flow convertor 32 may insert a switch for % w at 3.

Also, data flow convertor 32 may determine that (a) % z is used in 8 and defined in 2, and (b) 2 is lower in control dependency graph 610 than 8. In particular, 2 is one level lower than 8. Normally, the definition is at the same or higher level than the use, unless there is a back edge (which could be asserted if necessary). To handle % z for 8, data flow convertor 32 may trace 2 to the same level as 8 in control dependency graph 610. In that trace, 7 (which is a loop latch block and a self cycle) is at the same level as 8. Consequently, data flow convertor 32 may insert a switch for % z at 7.

Also, data flow convertor 32 may determine that (a) % x is used in 2 and defined in 7, and (b) 2 is control dependent on 7. Consequently, data flow convertor 32 may insert a switch for % x at 7.

Also, data flow convertor 32 may determine that (a) % x is used in 4 and defined in 7. This is another case of the use being at higher level than the definition. Similar to % z usage in 8, data flow convertor 32 travels on level up in control dependency graph 610, find a self-cycle at 7, and inserts a switch for % x there.

As has been described, a data flow convertor uses a specific definition of control dependency to generate a control dependency graph, and the data flow convertor then uses the control dependency graph to generate a data flow graph and a data flow program. By using the approach described herein, the data flow convertor may generate a data flow graph that is smaller than the data flow graphs created by other types of utilities. This relatively small data flow graph may enable the data flow convertor to generate a data flow program that is also relatively small. Consequently, the data flow program may execute with less overhead than data flow program from other types of utilities. For instance, the data flow program may be smaller, and it may consume less power.

By contrast, other types of utilities may require changes to the control flow graph. However, such changes are error prone, and such changes may even be impossible (e.g., when the program can throw exceptions). Such changes may also require extra computing, as compared to a data flow program generated according to the present disclosure. For example, a control flow graph may be changed to convert an "if statement" into code that computes both branches. However, computing both branches typically wastes energy.

A data flow convertor according to the present disclosure may avoid code duplication. When a utility uses code duplication, the resulting data flow program may be bigger. And when that program is mapped to the data flow processor, the program may occupy more silicon space, it may consume more power, and it may take longer to run, relative to a control flow program that avoids at least some of the code duplication. Additionally, the present data flow convertor may complete the conversion process more quickly than other types of utilities.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Also, this disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. And software that is used during the boot process may be referred to as firmware, as indicated above. Software that is stored in nonvolatile memory may also be referred to as firmware. In addition, terms like "program" and "module" may be used in general to cover a broad range of software constructs, including applications, routines, drivers, subprograms, processes, and other types of software components. Any suitable operating environment and programming language (or combination of operating environments and programming languages) may be used to implement software components described herein.

Alternative embodiments include machine-accessible media encoding instructions or control logic for performing the operations described herein. Such embodiments may also be referred to as program products. Such machine-accessible media may include, without limitation, tangible storage media such as magnetic disks, optical disks, RAM, read-only memory (ROM), etc., as well as processors, controllers, and other components that include RAM, ROM, and/or other storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

Also, it should be understood that any particular software module may include more than one component. For instance, a main bootcode module may include two or more components, and those components may cooperate to complete the operations of the main bootcode module, such as booting to an OS.

Similarly, instructions for multiple components may be stored in one non-transitory machine accessible medium. In at least one other embodiment, two or more non-transitory machine-accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, accelerators, systems on a chip (SOCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a CPU, etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with technology for automatically converting a control flow program into a data flow program. The data processing system comprises a processor, a non-transitory machine-readable medium responsive to the processor, and a translator stored in the machine-readable medium. The translator, when executed by the data processing system, enables the data processing system to (a) automatically generate a control dependency graph for a control flow program; (b) automatically generate a data flow graph, based at least in part on the control dependency graph; and (c) automatically generate a data flow program, based at least in part on the data flow graph.

Example A2 is a data processing system according to Example A1, wherein the translator, when executed, enables the data processing system to (a) automatically associate variables with different control dependency regions in the control flow program; (b) for at least one particular variable in the control flow program, automatically determine whether said variable is defined in one control dependency region and used in a different control dependency region; and (c) in response to a determination that said variable is defined in one control dependency region and used in a different control dependency region, automatically insert a switch instruction into the data flow program.

Example A3 is a data processing system according to Example A2, wherein the switch instruction names (i) a control channel to receive a control value, (ii) an input channel to receive an input value, and (iii) at least two output channels. Also, the switch instruction is designed to perform the following operations, when executed: (a) selecting one of the output channels, based at least in part on the control value; and (b) producing the input value on the selected output channel.

Example A4 is a data processing system according to Example A3, wherein the switch instruction is also designed to consume the control value and the input value when executed.

Example A5 is a data processing system according to Example A1, wherein the translator, when executed, enables the data processing system to: (a) automatically identify control dependencies between basic blocks, wherein each control dependency involves a control dependent basic block and a parent basic block; (b) automatically determine execution frequency for basic blocks; and (c) automatically generate a list of control dependency regions, based at least in part on determinations of (i) whether each basic block in a sequence of basic blocks is directly control dependent on the same parent basic block and (ii) whether each basic block in said sequence has the same execution frequency. Example A5 may also include the features of any one or more of Examples A2 through A4.

Example A6 is a data processing system according to Example A1, wherein the control flow program has at least two points (A, B) and an end. Also, the operation of automatically generating the control dependency graph comprises: (i) determining whether more than one path exists from point A to the end; (ii) if more than one path exists from point A to the end, determining whether one of said paths passes through point B and another of said paths does not pass through point B; (iii) in response to determining that (a) more than one path exists from point A to the end and (b) one of said paths passes through B and another of said paths does not pass through point B, flagging point B as being control dependent on point A; and (iv) including an edge from point A to point B in the control dependency graph if and only if point B is control dependent on point A. Example A6 may also include the features of any one or more of Examples A2 through A5.

Example A7 is a data processing system according to Example A6, wherein each of point A and point B comprises at least one item from the group consisting of: (a) an instruction from the control flow program; (b) an instance, in a loop, of an instruction from the control flow program; (c) a basic block from the control flow program; and (d) an instance, in a loop, of a basic block from the control flow program.

Example A8 is a data processing system according to Example A1, wherein the translator comprises a compiler. Example A8 may also include the features of any one or more of Examples A2 through A7.

Example A9 is a data processing system according to Example A1, wherein the processor comprises a control flow processor, the data processing system further comprises a data flow processor, and the translator includes control flow instructions to be executed by the control flow processor. Also, the translator, when executed by the control flow processor, enables the data processing system to store the data flow program in the machine-readable medium. Also, the control flow program comprises a control flow version of a source program, and the data flow program comprises a data flow version of the source program. The data flow program enables the data processing system to execute the data flow version of the source program on the data flow processor. Example A9 may also include the features of any one or more of Examples A2 through A8.

Example B1 is an apparatus for automatically converting a control flow program into a data flow program. The apparatus comprises a non-transitory machine-readable medium and a translator stored in the machine-readable medium. The translator, when executed by a data processing system, enables the data processing system to (a) automatically generate a control dependency graph for a control flow program; (b) automatically generate a data flow graph, based at least in part on the control dependency graph; and (c) automatically generate a data flow program, based at least in part on the data flow graph.

Example B2 is an apparatus according to Example B1, wherein the translator, when executed, enables the data processing system to (a) automatically associate variables with different control dependency regions in the control flow program; (b) for at least one particular variable in the control flow program, automatically determine whether said variable is defined in one control dependency region and used in a different control dependency region; and (c) in response to a determination that said variable is defined in one control dependency region and used in a different control dependency region, automatically insert a switch instruction into the data flow program.

Example B3 is an apparatus according to Example B2, wherein the switch instruction names (i) a control channel to receive a control value, (ii) an input channel to receive an input value, and (iii) at least two output channels. Also, the switch instruction is designed to perform the following operations, when executed: (a) selecting one of the output channels, based at least in part on the control value; and (b) producing the input value on the selected output channel.

Example B4 is an apparatus according to Example B3, wherein the switch instruction is also designed to consume the control value and the input value when executed.

Example B5 is an apparatus according to Example B1, wherein the translator, when executed, enables the data processing system to: (a) automatically identify control dependencies between basic blocks, wherein each control dependency involves a control dependent basic block and a parent basic block; (b) automatically determine execution frequency for basic blocks; and (c) automatically generate a list of control dependency regions, based at least in part on determinations of (i) whether each basic block in a sequence of basic blocks is directly control dependent on the same parent basic block and (ii) whether each basic block in said sequence has the same execution frequency. Example B5 may also include the features of any one or more of Examples B2 through B4.

Example B6 is an apparatus according to Example B1, wherein the control flow program has at least two points (A, B) and an end. Also, the operation of automatically generating the control dependency graph comprises: (i) determining whether more than one path exists from point A to the end; (ii) if more than one path exists from point A to the end, determining whether one of said paths passes through point B and another of said paths does not pass through point B; (iii) in response to determining that (a) more than one path exists from point A to the end and (b) one of said paths passes through B and another of said paths does not pass through point B, flagging point B as being control dependent on point A; and (iv) including an edge from point A to point B in the control dependency graph if and only if point B is control dependent on point A. Example B6 may also include the features of any one or more of Examples B2 through B5.

Example B7 is an apparatus according to Example B6, wherein each of point A and point B comprises at least one item from the group consisting of: (a) an instruction from the control flow program; (b) an instance, in a loop, of an instruction from the control flow program; (c) a basic block from the control flow program; and (d) an instance, in a loop, of a basic block from the control flow program.

Example B8 is an apparatus according to Example B1, wherein the translator comprises a compiler. Example B8 may also include the features of any one or more of Examples B2 through B7.

Example B9 is an apparatus according to Example B1, wherein the translator includes control flow instructions to be executed by a control flow processor in the data processing system. Also, the translator, when executed by the control flow processor, enables the data processing system to store the data flow program in the machine-readable medium. Also, the control flow program comprises a control flow version of a source program, and the data flow program comprises a data flow version of the source program. The data flow program enables a device with a data flow processor to execute the data flow version of the source program on the data flow processor. Example B9 may also include the features of any one or more of Examples B2 through B8.

Example C1 is a method for automatically converting a control flow program into a data flow program. The method comprises (a) using a translator executing in a data processing system to automatically generate a control dependency graph for a control flow program; (b) using the translator executing in the data processing system to automatically generate a data flow graph, based at least in part on the control dependency graph; and (c) using the translator executing in the data processing system to automatically generate a data flow program, based at least in part on the data flow graph.

Example C2 is a method according to Example C1, further comprising, using the translator executing in the data processing system to automatically perform operations comprising: (a) associating variables with different control dependency regions in the control flow program; (b) for at least one particular variable in the control flow program, determining whether said variable is defined in one control dependency region and used in a different control dependency region; and (c) in response to a determination that said variable is defined in one control dependency region and used in a different control dependency region, inserting a switch instruction into the data flow program.

Example C3 is a method according to Example C2, wherein the switch instruction names (i) a control channel to receive a control value, (ii) an input channel to receive an input value, and (iii) at least two output channels. Also, the switch instruction is designed to perform the following operations, when executed: (a) selecting one of the output channels, based at least in part on the control value; and (b) producing the input value on the selected output channel.

Example C4 is a method according to Example C3, wherein the switch instruction is also designed to consume the control value and the input value when executed.

Example C5 is a method according to Example C1, further comprising, using the translator executing in the data processing system to automatically perform operations comprising: (a) identifying control dependencies between basic blocks, wherein each control dependency involves a control dependent basic block and a parent basic block; (b) determining execution frequency for basic blocks; and (c) generating a list of control dependency regions, based at least in part on determinations of (i) whether each basic block in a sequence of basic blocks is directly control dependent on the same parent basic block and (ii) whether each basic block in said sequence has the same execution frequency. Example C5 may also include the features of any one or more of Examples C2 through C4.

Example C6 is a method according to Example C1, wherein the control flow program has at least two points (A, B) and an end. Also, the operation of automatically generating the control dependency graph comprises: (i) determining whether more than one path exists from point A to the end; (ii) if more than one path exists from point A to the end, determining whether one of said paths passes through point B and another of said paths does not pass through point B; (iii) in response to determining that (a) more than one path exists from point A to the end and (b) one of said paths passes through B and another of said paths does not pass through point B, flagging point B as being control dependent on point A; and (iv) including an edge from point A to point B in the control dependency graph if and only if point B is control dependent on point A. Example C6 may also include the features of any one or more of Examples C2 through C5.

Example C7 is a method according to Example C6, wherein each of point A and point B comprises at least one item from the group consisting of: (a) an instruction from the control flow program; (b) an instance, in a loop, of an instruction from the control flow program; (c) a basic block from the control flow program; and (d) an instance, in a loop, of a basic block from the control flow program.

Example C8 is a method according to Example C1, wherein the translator comprises a compiler. Example C8 may also include the features of any one or more of Examples C2 through C7.

Example C9 is a method according to Example C1, wherein the translator includes control flow instructions to be executed by a control flow processor in the data processing system. Also, the control flow program comprises a control flow version of a source program, and the data flow program comprises a data flow version of the source program. Also, the method further comprises executing the data flow version of the source program on a data flow processor. Example C9 may also include the features of any one or more of Examples C2 through C8.

Example D is at least one machine-accessible medium comprising computer instructions for automatically converting a control flow program into a data flow program. The computer instructions, in response to being executed in a device, enable the device to perform a method according to any of Examples C1 through C9.

Example E is a data processing system with technology for automatically converting a control flow program into a data flow program. The data processing system comprises a processing element, at least one machine-accessible medium responsive to the processing element; and computer instructions stored at least partially in the at least one machine-accessible medium. The computer instructions, in response to being executed, enable the data processing system to perform a method according to any of Examples C1 through C9.

Example F is a data processing system with technology for automatically converting a control flow program into a data flow program. The data processing system comprises means for performing the method of any one of Examples C1 through C9.

What is claimed is:

1. A data processing system with technology for automatically converting a control flow program into a data flow program, the data processing system comprising: a processor; a non-transitory machine-readable medium responsive to the processor; and a translator stored in the machine-readable medium, wherein the translator, when executed by the data processing system, enables the data processing system to: automatically generate a control dependency graph for a control flow program; automatically generate a data flow graph, based at least in part on the control dependency graph; for at least one variable in the control flow program, automatically determine whether the at least one variable is defined in one control dependency region and used in a different control dependency region; and automatically generate a data flow program, based at least in part on the data flow graph, wherein to automatically generate the data flow program comprises to, in response to a determination that the at least one variable is defined in one control dependency region and used in a different control dependency region, automatically insert a switch instruction into the data flow program, and wherein the switch instruction, when executed by a data flow processor, causes production of an input value on a selected output channel of at least two output channels of the data flow processor.

2. A data processing system according to claim 1, wherein: the switch instruction names (i) a control channel to receive a control value, (ii) an input channel to receive the input value, and (iii) the at least two output channels; and the switch instruction is designed to perform the following operations, when executed: selecting one of the output channels, based at least in part on the control value.

3. A data processing system according to claim 2, wherein the switch instruction is also designed to consume the control value and the input value when executed.

4. A data processing system according to claim 1, wherein the translator, when executed, enables the data processing system to:
automatically identify control dependencies between basic blocks, wherein each control dependency involves a control dependent basic block and a parent basic block;
automatically determine execution frequency for basic blocks; and
automatically generate a list of control dependency regions, based at least in part on determinations of (a) whether each basic block in a sequence of basic blocks is directly control dependent on the same parent basic block and (b) whether each basic block in said sequence has the same execution frequency.

5. A data processing system according to claim 1, wherein:
the control flow program has at least two points (A, B) and an end; and
the operation of automatically generating the control dependency graph comprises:
determining whether more than one path exists from point A to the end;
if more than one path exists from point A to the end, determining whether one of said paths passes through point B and another of said paths does not pass through point B;
in response to determining that (a) more than one path exists from point A to the end and (b) one of said paths passes through B and another of said paths does not pass through point B, flagging point B as being control dependent on point A; and
including an edge from point A to point B in the control dependency graph if and only if point B is control dependent on point A.

6. A data processing system according to claim 5, wherein each of point A and point B comprises at least one item from the group consisting of:
   an instruction from the control flow program;
   an instance, in a loop, of an instruction from the control flow program;
   a basic block from the control flow program; and
   an instance, in a loop, of a basic block from the control flow program.

7. A data processing system according to claim 1, wherein the translator comprises a compiler.

8. A data processing system according to claim 5, wherein:
   the processor comprises a control flow processor;
   the data processing system further comprises a data flow processor;
   the translator includes control flow instructions to be executed by the control flow processor;
   the translator, when executed by the control flow processor, enables the data processing system to store the data flow program in the machine-readable medium;
   the control flow program comprises a control flow version of a source program;
   the data flow program comprises a data flow version of the source program; and
   the data flow program enables the data processing system to execute the data flow version of the source program on the data flow processor.

9. An apparatus for automatically converting a control flow program into a data flow program, the apparatus comprising: a non-transitory machine-readable medium; and a translator stored in the machine-readable medium, wherein the translator, when executed by a data processing system, enables the data processing system to: automatically generate a control dependency graph for a control flow program; automatically generate a data flow graph, based at least in part on the control dependency graph; for at least one variable in the control flow program, automatically determine whether the at least one variable is defined in one control dependency region and used in a different control dependency region; and automatically generate a data flow program, based at least in part on the data flow graph, wherein to automatically generate the data flow program comprises to, in response to a determination that the at least one variable is defined in one control dependency region and used in a different control dependency region, automatically insert a switch instruction into the data flow program, and wherein the switch instruction, when executed by a data flow processor, causes production of an input value on a selected output channel of at least two output channels of the data flow processor.

10. An apparatus according to claim 9, wherein: the switch instruction names (i) a control channel to receive a control value, (ii) an input channel to receive the input value, and (iii) the at least two output channels; and the switch instruction is designed to perform the following operations, when executed: selecting one of the output channels, based at least in part on the control value.

11. An apparatus according to claim 10, wherein the switch instruction is also designed to consume the control value and the input value when executed.

12. An apparatus according to claim 9, wherein the translator, when executed, enables the data processing system to:
   automatically identify control dependencies between basic blocks, wherein each control dependency involves a control dependent basic block and a parent basic block;
   automatically determine execution frequency for basic blocks; and
   automatically generate a list of control dependency regions, based at least in part on determinations of (a) whether each basic block in a sequence of basic blocks is directly control dependent on the same parent basic block and (b) whether each basic block in said sequence has the same execution frequency.

13. An apparatus according to claim 9, wherein:
   the control flow program has at least two points (A, B) and an end; and
   the operation of automatically generating the control dependency graph comprises:
      determining whether more than one path exists from point A to the end;
      if more than one path exists from point A to the end, determining whether one of said paths passes through point B and another of said paths does not pass through point B;
      in response to determining that (a) more than one path exists from point A to the end and (b) one of said paths passes through B and another of said paths does not pass through point B, flagging point B as being control dependent on point A; and
      including an edge from point A to point B in the control dependency graph if and only if point B is control dependent on point A.

14. An apparatus according to claim 13, wherein each of point A and point B comprises at least one item from the group consisting of:
   an instruction from the control flow program;
   an instance, in a loop, of an instruction from the control flow program;
   a basic block from the control flow program; and
   an instance, in a loop, of a basic block from the control flow program.

15. An apparatus according to claim 9, wherein the translator comprises a compiler.

16. An apparatus according to claim 9, wherein:
   the translator includes control flow instructions to be executed by a control flow processor in the data processing system;
   the translator, when executed by the control flow processor, enables the data processing system to store the data flow program in the machine-readable medium;
   the control flow program comprises a control flow version of a source program;
   the data flow program comprises a data flow version of the source program; and
   the data flow program enables a device with a data flow processor to execute the data flow version of the source program on the data flow processor.

17. A method for automatically converting a control flow program into a data flow program, the method comprising: using a translator executing in a data processing system to automatically generate a control dependency graph for a control flow program; using the translator executing in the data processing system to automatically generate a data flow graph, based at least in part on the control dependency graph; for at least one variable in the control flow program, using the translator executing in the data processing system to automatically determine whether the at least one variable is defined in one control dependency region and used in a different control dependency region; and using the translator executing in the data processing system to automatically generate a data flow program, based at least in part on the data flow graph, wherein to automatically generate the data flow program comprises to, in response to a determination that the at least one variable is defined in one control dependency region and used in a different control dependency region, automatically insert a switch instruction into the data flow program, and wherein the switch instruction, when executed by a data flow processor, causes production of an input value on a selected output channel of at least two output channels of the data flow processor.

18. A method according to claim 17, wherein: the switch instruction names (i) a control channel to receive a control value, (ii) an input channel to receive the input value, and (iii) the at least two output channels; and the switch instruction is designed to perform the following operations, when executed: selecting one of the output channels, based at least in part on the control value.

19. A method according to claim 17, further comprising, using the translator executing in the data processing system to automatically perform operations comprising:
identifying control dependencies between basic blocks, wherein each control dependency involves a control dependent basic block and a parent basic block;
determining execution frequency for basic blocks; and
generating a list of control dependency regions, based at least in part on determinations of (a) whether each basic block in a sequence of basic blocks is directly control dependent on the same parent basic block and (b) whether each basic block in said sequence has the same execution frequency.

20. A method according to claim 17, wherein:
the control flow program has at least two points (A, B) and an end; and
the operation of automatically generating the control dependency graph comprises:
determining whether more than one path exists from point A to the end;
if more than one path exists from point A to the end, determining whether one of said paths passes through point B and another of said paths does not pass through point B;
in response to determining that (a) more than one path exists from point A to the end and (b) one of said paths passes through B and another of said paths does not pass through point B, flagging point B as being control dependent on point A; and
including an edge from point A to point B in the control dependency graph if and only if point B is control dependent on point A.

21. A method according to claim 20, wherein each of point A and point B comprises at least one item from the group consisting of:
an instruction from the control flow program;
an instance, in a loop, of an instruction from the control flow program;
a basic block from the control flow program; and
an instance, in a loop, of a basic block from the control flow program.

22. A method according to claim 17, wherein the translator comprises a compiler.

* * * * *